US008601064B1

(12) United States Patent
Liao et al.

(10) Patent No.: US 8,601,064 B1
(45) Date of Patent: Dec. 3, 2013

(54) TECHNIQUES FOR DEFENDING AN EMAIL SYSTEM AGAINST MALICIOUS SOURCES (75) Inventors: En-Yi Liao, Santa Clara, CA (US); Cheng-Lin Hou, Cupertino, CA (US); Chinghsien Liao, Cupertino, CA (US)

(73) Assignee: Trend Micro Incorporated, Tokyo (JP)

( * ) Notice: Subject to any disclaimer, the term of this patent is extended or adjusted under 35 U.S.C. 154(b) by 1283 days.

(21) Appl. No.: 11/414,120

(22) Filed: Apr. 28, 2006

(51) Int. Cl.
*G06F 15/16* (2006.01)

(52) U.S. Cl.
USPC .......................................... 709/206

(58) Field of Classification Search
USPC .......................................... 709/206
See application file for complete search history.

(56) References Cited

U.S. PATENT DOCUMENTS

| | | | | |
|---|---|---|---|---|
| 5,822,526 | A * | 10/1998 | Waskiewicz | 709/206 |
| 6,393,465 | B2 * | 5/2002 | Leeds | 709/207 |
| 6,546,416 | B1 * | 4/2003 | Kirsch | 709/206 |
| 6,654,789 | B1 * | 11/2003 | Bliss et al. | 709/206 |
| 6,965,919 | B1 * | 11/2005 | Woods et al. | 709/206 |
| 7,072,942 | B1 * | 7/2006 | Maller | 709/206 |
| 7,249,175 | B1 * | 7/2007 | Donaldson | 709/225 |
| 7,472,163 | B1 * | 12/2008 | Ben-Yoseph et al. | 709/206 |
| 7,610,344 | B2 * | 10/2009 | Mehr et al. | 709/206 |
| 2005/0027597 | A1 * | 2/2005 | Peterson | 705/14 |
| 2005/0076084 | A1 * | 4/2005 | Loughmiller et al. | 709/206 |
| 2005/0076237 | A1 * | 4/2005 | Cohen et al. | 713/201 |
| 2005/0108393 | A1 * | 5/2005 | Banerjee et al. | 709/225 |
| 2005/0188031 | A1 * | 8/2005 | Zandt | 709/206 |
| 2005/0198173 | A1 * | 9/2005 | Evans | 709/206 |
| 2006/0010215 | A1 * | 1/2006 | Clegg et al. | 709/206 |
| 2006/0036690 | A1 * | 2/2006 | O'Neil | 709/206 |
| 2006/0059238 | A1 * | 3/2006 | Slater et al. | 709/206 |
| 2006/0075030 | A1 * | 4/2006 | van Riel | 709/206 |
| 2006/0123083 | A1 * | 6/2006 | Goutte et al. | 709/206 |
| 2006/0168017 | A1 * | 7/2006 | Stern et al. | 709/206 |
| 2006/0168024 | A1 * | 7/2006 | Mehr et al. | 709/206 |
| 2008/0016167 | A1 * | 1/2008 | Lund et al. | 709/206 |
| 2008/0052359 | A1 * | 2/2008 | Golan et al. | 709/206 |

OTHER PUBLICATIONS

Keisuke Ishibashi, et al., and Masahiro Ishino, et al., "Detecting Mass-Mailing Worm Infected Hosts by Mining DNS Traffic Data", Sigcomm 2005 Workshops, Aug. 22-26, 2005, ACM, PA, USA.
SMTP reply codes, pp. 1-5. Website [online] [retrieved on Apr. 13, 2006]. Retrieved from the Internet<URL:http//www.xequte.com/support/maillistking/smtperrors.html>.
Simple Mail Transfer Protocol, AT & T Laboratories, Apr. 2001. pp. 1-74. Website [online] [retrieved on Apr. 6, 2006]. Retrieved from the Internet<URL:http//www.ietf.org/rfc/rfc2821.txt?number=2821>.

* cited by examiner

*Primary Examiner* — Rupal Dharia
*Assistant Examiner* — Robert B McAdams
(74) *Attorney, Agent, or Firm* — Okamoto & Benedicto LLP (57) ABSTRACT

In one embodiment, a server computer determines whether an email entering a private computer network is malicious (e.g., part of a directory harvest attack or bounce-source attack) by determining the recipient email address of the email and the Internet Protocol (IP) address of the source of the email. When the server computer determines that the email is malicious, the server computer may reject the email by sending a non-deterministic response to the source of the email. The non-deterministic response may include an error message that is different from the actual reason why the email is being rejected. The rejection may be sent as an immediate reply or postponed, for example.

6 Claims, 5 Drawing Sheets

TECHNIQUES FOR DEFENDING AN EMAIL SYSTEM AGAINST MALICIOUS SOURCES

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

BACKGROUND OF THE INVENTION

1. Field of the Invention

The present invention relates generally to electronic mails, and more particularly but not exclusively to computer network security.

2. Description of the Background Art

Electronic mail ("email") has become a relatively common means of communication among individuals with access to a computer network, such as the Internet. Among its advantages, email is relatively convenient, fast, and cost-effective compared to traditional mail. It is thus no surprise that a lot of businesses and home computer users have some form of email access. Unfortunately, the features that make email popular also lead to its abuse. Specifically, some advertisers have resorted to mass emailings of advertisements over the Internet. These mass emails, which are also referred to as "spam emails" or simply "spam," are sent to computer users regardless of whether they asked for them or not. Spam includes any unsolicited email, not just advertisements. Spam is not only a nuisance, but is also an economic burden to businesses due to resulting loss in employee productivity.

Some spammers have resorted to malicious means to gather valid email addresses or to send spam. Some of these means, such as directory harvest attacks and bounce-source attacks, not only increase proliferation of spam but also put a heavy load on email systems.

SUMMARY

In one embodiment, a server computer determines whether an email entering a private computer network is malicious (e.g., part of a directory harvest attack or bounce-source attack) by determining the recipient email address of the email and the Internet Protocol (IP) address of the source of the email. When the server computer determines that the email is malicious, the server computer may reject the email by sending a non-deterministic response to the source of the email. The non-deterministic response may include an error message that is different from the actual reason why the email is being rejected. The rejection may be sent as an immediate reply or be postponed, for example.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Components may be implemented separately in multiple modules or together in a single module.

Figure 1:
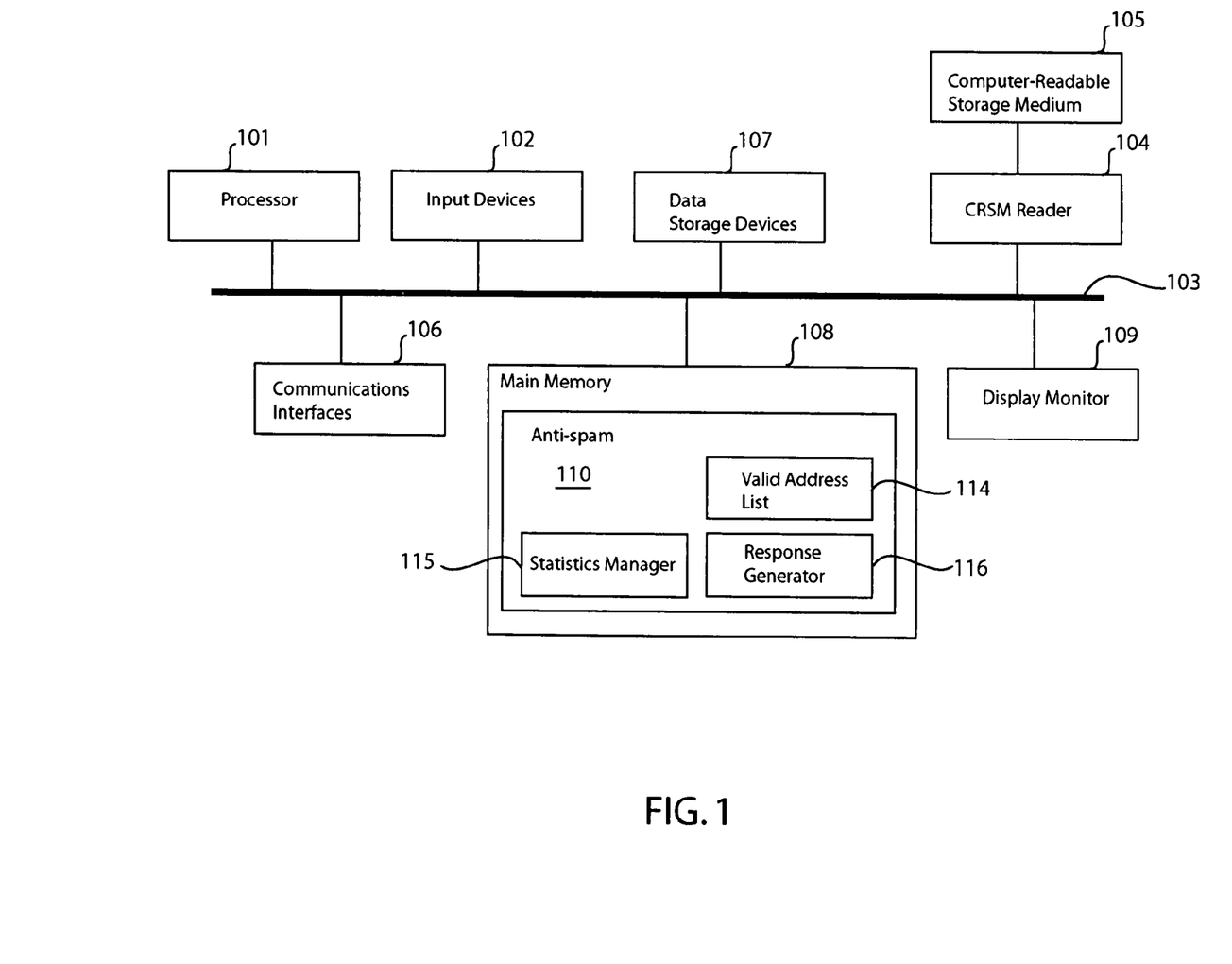
FIG. 1 shows a schematic diagram of an example computer that may be used in embodiments of the present invention.

Referring now to FIG. 1, there is shown a schematic diagram of an example computer that may be used in embodiments of the present invention. The computer shown in the example of FIG. 1 may be employed as an email gateway 420 (see FIG. 4), for example. The computer of FIG. 1 may have less or more components to meet the needs of a particular application. As shown in FIG. 1, the computer may include a processor 101, such as those from the Intel Corporation or Advanced Micro Devices, for example. The computer may have one or more buses 103 coupling its various components. The computer may include one or more input devices 102 (e.g., keyboard, mouse), a computer-readable storage medium (CRSM) 105 (e.g., floppy disk, CD-ROM), a CRSM reader 104 (e.g., floppy drive, CD-ROM drive), a display monitor 109 (e.g., LCD, cathode ray tube, flat panel display), communications interfaces 106 (e.g., network adapters, modems) for communicating over computer networks, one or more data storage devices 107 (e.g., hard disk drive, optical drive, FLASH memory), and a main memory 108 (e.g., RAM). Software embodiments may be stored in a computer-readable storage medium 105 for reading into a data storage device 107 or main memory 108. Software embodiments may also be received over a computer network by way of a communications interface 106. In the example of FIG. 1, main memory 108 includes a later described anti-spam 110 (see also FIG. 4), which may be configured to determine whether an email from an email source is malicious (e.g., part of an attack) and to generate a response to the email source. The anti-spam 110 may be executed by the processor 101.

Some anti-spam techniques rely on so called "real time black hole lists" to identify spam. A real time black hole list (RBL) is a listing of Internet Protocol (IP) addresses of computers suspected of sending spam. An RBL operator typically maintains computers configured to receive emails from the Internet. These computers, referred to as "honey pots," are used by the RBL operator to identify spam and sources of spam. Once a spam source is identified, that spam source's IP address is added to the RBL. Email gateways or other anti-spam computer subscribing to the RBL may compare the source IP address of an incoming email to the RBL to determine if the incoming email is from a suspected spam source. If so, the email is assumed to be spam and prevented from being received by the intended recipient.

To get around RBL checking, some spammers employ a bounce-source attack. In a bounce-source attack, spam is bounced from a legitimate domain to an intended spam victim domain. The idea behind the bounce-source attack is that since the legitimate domain is likely not included in an RBL, the spam victim domain will likely accept the spam. This gets around an RBL or other IP address reputation protection.

Figure 2:
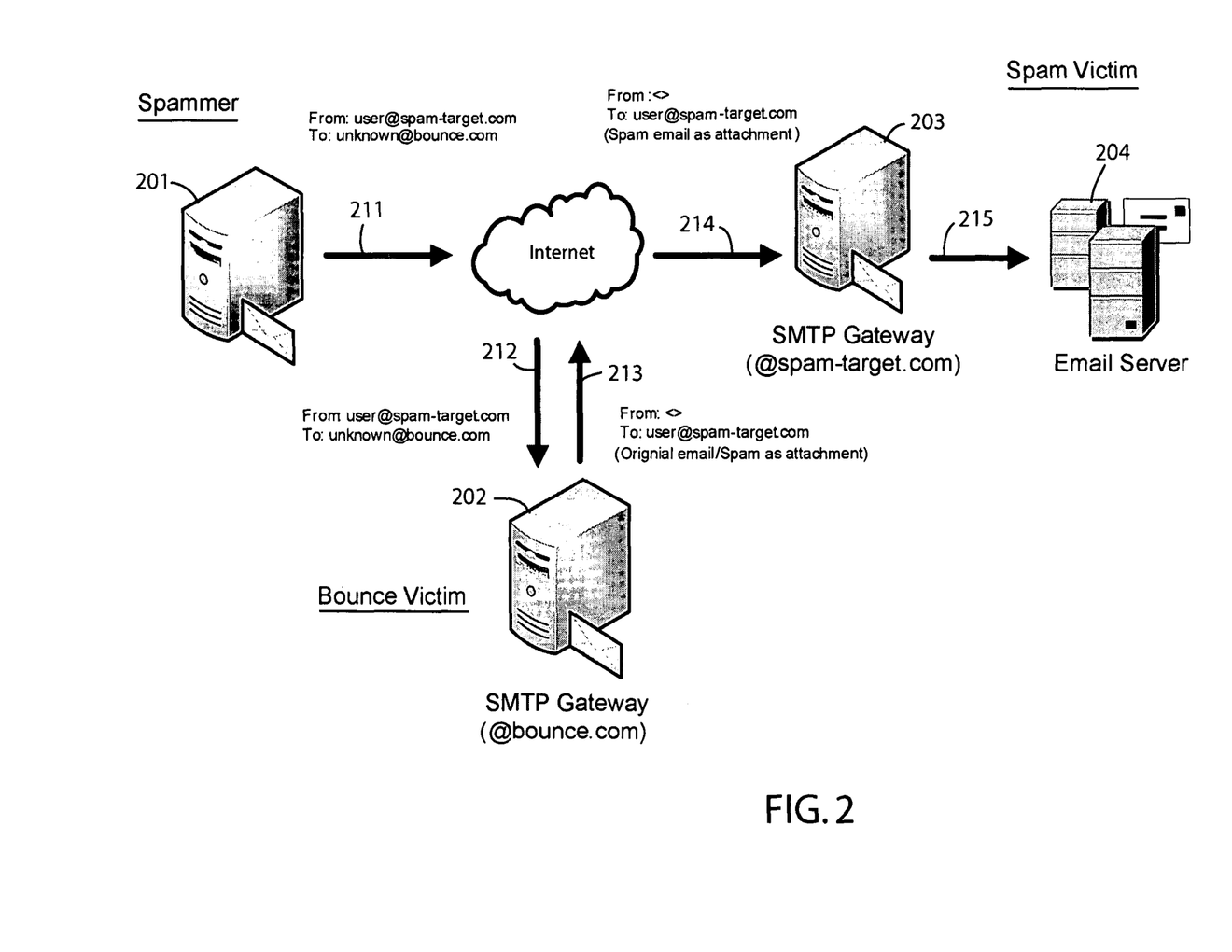
FIG. 2 schematically illustrates how bounce-source attack works.

FIG. 2 schematically illustrates how bounce-source attack works. In FIG. 2, a spammer employing a computer 201 as an email client sends spam to the domain served by the simple mail transfer protocol (SMTP) gateway 202 (arrows 211 and 212). The spam has an originator email address of the intended spam victim, which is "user@spam-target.com" in this example, rather than that of the spammer. The spam is also addressed to an invalid (i.e., non-existent) recipient email address in the domain of the SMTP gateway 202, which is "bounce.com" in this example. When the SMTP gateway 202 receives the spam, the SMTP gateway 202 determines that the spam is addressed to an invalid recipient email address and accordingly rejects the spam by bouncing it to the originator email address of the spam, which is "user@spam-target.com" in this example. This results in the spam being bounced from the SMTP gateway 202 to the SMTP gateway 203 of the domain "@spam-target.com" (arrows 213 and 214). Because the SMTP gateway 202 is not ordinarily used to send spam, its IP address is not likely to be in an RBL. This increases the chance of the bounced spam being accepted by the SMTP gateway 203 and forwarded to the email server 204.

Spammers (and hackers) may perform a directory harvest attack (DHA) to learn of valid email addresses (i.e., email addresses with corresponding mailboxes or email accounts). In a first type of directory harvest attack, the spammer relies on a reply from the domain to determine if an email address is valid. Typically, the spammer sends emails to different combinations of email addresses of a particular domain and waits for a reply. If the reply includes a return code that indicates the email has been successfully received in the domain, the spammer assumes that the recipient email address of the email is valid. Otherwise, the spammer assumes the recipient email address of the email is invalid. Table 1 shows a log of an example email transaction between an email client and an SMTP gateway in the first type of directory harvest attack.

TABLE 1

X-Trend-FH-Time-Received: 29754816-2052042074
X-Trend-FH-Upstream-MTA-IP-And-Port: 213.10.44.203[3939]
X-Trend-FH-Session-29754817-2321896978-1-250: MAIL From:
    <semhbfrq@speed.planet.nl>
X-Trend-FH-Session-29754817-2326157398-1-550: RCPT
    To:<zekba@trendmicro.com>
X-Trend-FH-Session-29754817-2332330718-1-550: RCPT
    To:<tuannei@trendmicro.com>
X-Trend-FH-Session-29754817-2335510868-1-550: RCPT
    To:<p6xb@trendmicro.com>
X-Trend-FH-Session-29754817-2337419988-1-550: RCPT
    To:<c4d@trendmicro.com>

TABLE 1-continued

X-Trend-FH-Session-29754817-2344061468-1-250: RSET
X-Trend-FH-Session-29754817-2344061468-1-550: RCPT
    To:<xpjem@trendmicro.com>
X-Trend-FH-Session-29754817-2346128648-1-550: RCPT
    To:<cevez@trendmicro.com>
X-Trend-FH-Session-29754817-2348892408-1-550: RCPT
    To:<gwy163@trendmicro.com>
X-Trend-FH-Session-29754817-2357779728-1-250: RCPT
    To:<validuser@trendmicro.com>
X-Trend-FH-Session-29754817-2360287338-1-250: RSET In the example of Table 1, the "X-Trend-FH-Time-Received" header indicates the time when the SMTP transaction started; the "X-Trend-FH-Upstream-MTA-IP-And-Port" header indicates the email client's IP and port number; the "X-Trend-FH-Session-xxx" headers indicate the actual SMTP commands issued by the email client. Note that the last 3 digits of an X-Trend-FH-Session-xxx header represent the return code from the SMTP gateway for the specific SMTP command.

In the example of Table 1, the SMTP gateway replied with a return code 250 to the "RCPT TO" command to "validuser@trendmicro.com." In SMTP, return code 250 indicates that the SMTP gateway accepted the email. The spammer assumes that all recipient email addresses replied with a return code 250 are valid; recipient email addresses replied with other than return code 250 are assumed invalid. In the example of Table 1, the spammer assumes "validuser@trendmicro.com" is a valid recipient email address and thus a potential spam target.

In a second type of directory harvest attack, the spammer sends emails to different combinations of email addresses of a particular domain and waits for a reply. According to SMTP, an SMTP gateway receiving an undeliverable email must send a non-delivery report (NDR) notification email to the sender (see section 6.1 of RFC 2821 of the Internet Engineering Task Force (IETF)). To take advantage of this, in the second type of directory harvest attack, the spammer assumes that any email not replied with an NDR notification was sent to a valid recipient email address.

As can be appreciated, a directory harvest attack not only allows spammers to obtain valid email addresses but, like a bounce-source attack, may also put tremendous traffic load on servers in the domain.

Currently available techniques for addressing directory harvest and bounce-source attacks involve a combination of unknown recipient blocking and email traffic throttling on the SMTP gateway. With unknown recipient blocking, any email not having a valid recipient email address is replied with a permanent error. This way, the SMTP gateway does not forward an NDR notification to the sender, stopping bounce-source and second type directory harvest attacks. However, even with this approach, the domain remains exposed to first type directory harvest attacks. To solve this dilemma, some SMTP gateways provide a preconfigured delay, so called "tar pit," on network traffic if the return code is a permanent error in order to slow down an attack. Unfortunately, the tar pit only slows down the attack, rather than directly address it.

Figure 3:
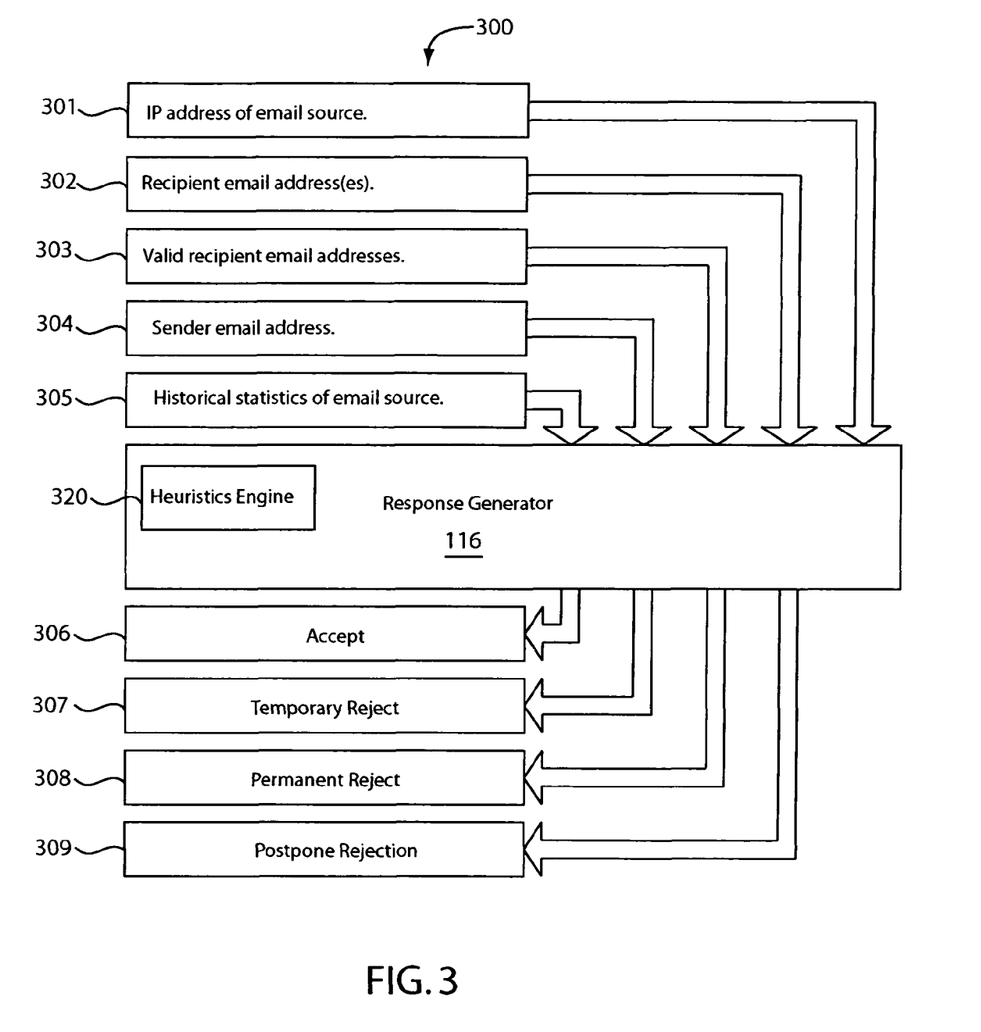
FIG. 3 schematically illustrates a method of preventing attacks on an email system in accordance with an embodiment of the present invention.

FIG. 3 schematically illustrates a method 300 of defending an email system from attacks in accordance with an embodiment of the present invention. The method 300 may be performed by an email gateway having an anti-spam 110 (see FIGS. 1 and 4), for example. The method 300 may be implemented as part of the email gateway software or a separate module. The method 300 is explained in the context of SMTP, but is equally applicable to other email protocols.

In the example of FIG. 3, the response generator 116 (see also FIG. 1) generates a response to an email source based on the IP address of the email source (box 301), the recipient email address or addresses of the email from the email source (box 302), valid recipient email addresses in the computer network secured by the email gateway (box 303), sender address of the email from the email source (box 304), and historical statistics of the email source (box 305). The email source may be an email client establishing a connection to the email gateway to forward an email thereto.

The email gateway receives the IP address of the email source as part of their connection. The response generator 116 may use the IP address of the email source to uniquely identify the email source. For example, the response generator 116 may use the IP address of the email source to get historical statistics of the email source. Suitable means of identifying the email source other than an IP address may also be used without detracting from the merits of the present invention.

The recipient email address or addresses of an email is sent by the email source to the email gateway. In SMTP, the email source provides the recipient email addresses to the email gateway using the "RCPT To" command. An email may be addressed to more than one recipient, each of which has a corresponding recipient email address.

The valid recipient email addresses in a domain are those email addresses having corresponding mailboxes (also referred to as "email accounts") in the domain. The valid recipient email addresses for the domain protected by the email gateway may be obtained from a valid email address list 114 (see FIG. 1), for example. The valid email address list 114 may be internally generated by the email gateway or be based on information from an email server or another directory service. Methods for generating valid email address lists are also disclosed in U.S. application Ser. No. 11/401,498, filed on Apr. 7, 2006, which is incorporated herein by reference in its entirety. Other suitable ways of generating a listing of valid email addresses in a domain may also be employed. The response generator 116 may consult the valid email address list 114 to determine whether or not a recipient email address of an email is valid.

The source email address is the email address of the sender of the email. In SMTP, the source email address is provided by the email source to the email gateway using the "MAIL From" command.

The historical statistics of the email source comprises information regarding previous connections or connection attempts of the email source to the domain protected by the email gateway. The historical statistics for email sources communicating with the email gateway may be gathered by the statistics manager 115 (see FIG. 1), for example. In one embodiment, the historical statistics may include a message failed count, recipient failed count, a distinct recipient count, and a total message count. Other historical statistics may also be used. The historical statistics may be employed to determine whether an email, and thus the email source, is malicious or not. The historical statistics may be gathered by one or more email gateways or other nodes of the email system for predetermined periods of time, which may be adjusted to suit a particular implementation.

The message failed count may indicate the number of emails, from a single email source, having at least one invalid recipient address (invalid RCPT TO address in SMTP) within a predetermined period of time. For example, assuming that in a one hour period the email source sent 100 different emails of which 80 include at least one invalid recipient address, the message failed count in that example is 80. Identifying invalid recipient email addresses is advantageous in that an invalid recipient email address is a key symptom of a directory harvest or bounce-source attack.

The recipient failed count may indicate the total number of invalid recipient email addresses from all emails from a particular email source within a predetermined period of time. For example, assuming an email source sent 100 emails to the email gateway within a period of 1 hour and the emails were addressed to 150 recipient email addresses, 30 of which are invalid recipient email addresses, the recipient failed count in that example is 30.

The distinct recipient count may indicate the total number of distinct recipient addresses from all emails from a particular email source within a predetermined period of time. For example, assuming an email source sent 100 emails within a period of 1 hour to the email gateway and those 100 emails are addressed to 150 recipient email addresses, 40 of which are distinct (i.e., there are 40 different email addresses), the distinct recipient count in that example is 40.

The total message count may indicate the total number of emails received from the email source within a predetermined period of time. For example, assuming an email source sent 100 emails to the email gateway within a period of 1 hour, the total message count in that example is 100.

As shown in FIG. 3, the response generator 116 may include a heuristics engine 320 for determining whether or not an email is from a malicious source. In one embodiment, the heuristics engine 320 comprises computer-readable program code for determining whether or not an email is malicious based on the IP address of an email source, the recipient email address or addresses of the email from the email source, valid recipient email addresses in the computer network secured by the email gateway, and historical statistics of the email source. Generally speaking, emails identified as being from a malicious source are rejected and those identified as legitimate (or not malicious) are accepted. Example rules that the heuristics engine 320 may employ include:

a) Emails from known malicious sources may be rejected and emails from known legitimate email sources may be accepted. IP addresses of known malicious sources may be obtained from a black list or historical statistics, while the IP addresses of known legitimate sources may be obtained from a white list or historical statistics.

b) In SMTP, an email from an email source that does not issue a DATA command and has a relatively high recipient failed count and total message count has a high probability of being malicious. This rule takes advantage of the fact that a typical directory harvest attack does not involve sending the body of the email because the spammer is primarily interested in the reply from the domain, which is sent by the domain after receiving the recipient email address from the email source.

c) The ratio of recipient failed count versus total message count for a particular email source is indicative of whether an email from the email source is malicious. The recipient email addresses of emails in second type directory harvest attacks and bounce-source attacks are typically "unknown," invalid addresses. Therefore, if the ratio of recipient failed count versus total message count for a particular email source is relatively high, an email from the particular email source is likely to be malicious.

d) If an email source has a relatively low distinct recipient count but high number of recipient failed count, then the email source is likely a legitimate email source that is resending on the belief that the initial email or emails included a misspelled or incorrectly entered recipient email address. The heuristics engine 320 may take this into account in determining whether or not to reject emails from a particular email source.
e) An email client may be classified as a bounce-source (i.e., a legitimate site being used by a malicious source to bounce emails from) when the ratio of bounced emails over the number of total emails received from the email client (bounce ratio) is greater than a threshold value. In that case, emails from the email client may be classified as malicious at least for a period of time.
f) The heuristic engine 320 may behave differently on relatively high recipient failed counts versus high hourly/daily failed counts. A high ratio of periodical failed counts over periodical messages counts persisting for a relatively long period of time indicates a constant attack pattern. On the other hand, a moderate swell of high recipient failed counts over a short period of time might represent an incorrectly configured email gateway or an email gateway with out-of-date recipient list, and should be treated as an exception case.
g) If the email gateway has previously sent legitimate emails to the email source, the email source has a low possibility of being an attacker.
h) If the email gateway has previously received a relatively high number of legitimate emails from an email source or has previously sent emails to the email source, emails from the email source are likely to be legitimate.
i) The heuristics engine may reject emails from particular source email addresses based on policies of the domain protected by the email gateway.

The heuristics engine 320 may employ other rules to identify malicious emails without detracting from the merits of the present invention. The heuristics engine 320 may adjust the results of the aforementioned rules to tune the result for a particular implementation. For example, the aforementioned rules may be assigned different weights depending on their effectiveness in identifying malicious emails in a particular environment. For each incoming email, the applicable weights may be totaled to generate a score, which can be compared to a reference value or threshold. A probability model, such as Bayesian Decision, may be employed in conjunction with the heuristic rules to predict whether an email is spam or part of an attack and accordingly rejected. String similarity assessments on email recipients from the same email source may also be used as an added factor in determining whether or not an email is from a malicious source.

Appendix A shows pseudo-codes implementing an example heuristics engine in accordance with an embodiment of the present invention. In the example of Appendix A, "recipient_failed_cnt" is the variable for the recipient failed count, "totalmsgcount" is the variable for total message count, and "dist_recipient_cnt" is the variable for distinct recipient count for a particular period of time (e.g., a period of ten minutes). The aforementioned variables are then compared to thresholds to determine whether or not to reject an email in a particular implementation.

Figure 4:
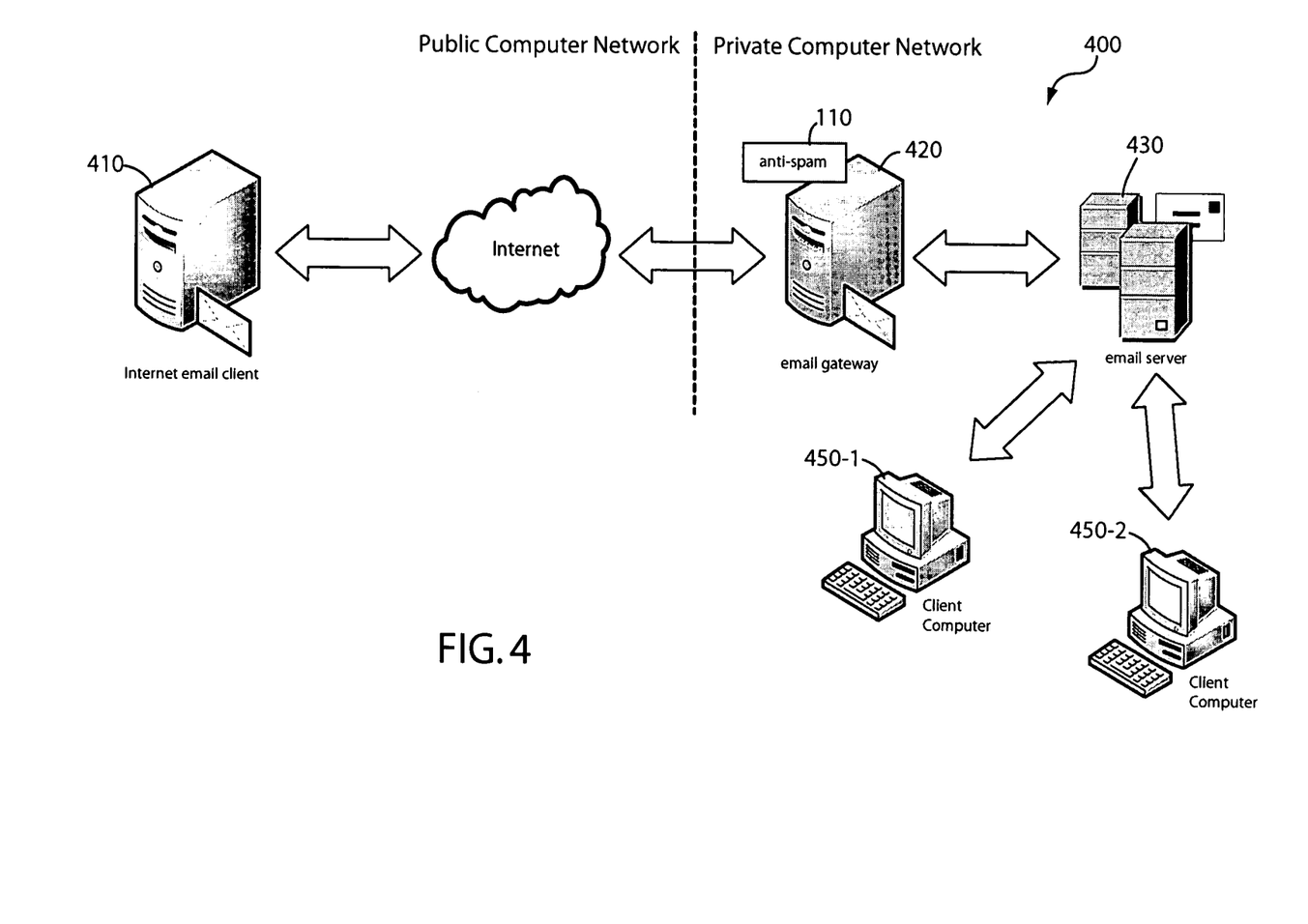
FIG. 4 schematically shows a computing environment in accordance with an embodiment of the present invention.

For example, Table 2 shows a code fragment from Appendix A that represents one sample rule for identifying a directory harvest or bounce-source attack from a malicious email source. The code fragment works as follows: if an external email source (e.g., email client 410) has sent more than 10 emails (i.e., totalmsgcount>=10) to the email gateway (e.g., email gateway 420) in the past 10 minute period, and has at least 10 emails that has at least one invalid recipient (e.g., RCPT TO: address in SMTP) email address (i.e., recipient_failed_count>=10), then it will trigger the rule since the boundary condition has been met and it is unlikely to be an random error. To further qualify the attack and exclude the possibility of a false-positive case, the rule indicates the distinct recipient addresses from the email source must meet the boundary condition (i.e., dist_recipient_cnt>=10) and must be diversified enough (i.e., dist_recipient_cnt>=totalmsgcount*0.2) and has a relatively high incorrect recipient address rate (i.e., recipient_failed_count>=totalmsgcount*0.3). If all above mentioned conditions are met, then the sample heuristic rule deems an email from an email source is malicious.

TABLE 2 where recipient_failed_cnt >= 10
and totalmsgcount >= 10
and dist_recipient_cnt >=10
and dist_recipient_cnt >= totalmsgcount*0.2
and recipient_failed_cnt >= totalmsgcount*0.3

In Appendix A, rules #4 and #5 may be employed to detect bounced emails and to compute the bounce ratio, respectively, from a particular email source. Generally speaking, the idea behind rules #4 and #5 is to first determine whether an email is bounced from a bounce victim (e.g., SMTP gateway 202 of FIG. 2) to a domain (e.g., SMTP gateway 203 of FIG. 2) by a malicious source (e.g., computer 201 of FIG. 2) based on a) whether the email has been accepted by the domain successfully; b) sender email address; c) email subject; and d) email header. The aforementioned characteristics of the email may be compared to patterns generated from known bounced emails. Bounced emails and their sources are added to the historical statistics, from which the bounce ratio (number of bounce messages/number of total messages) for a given IP address may be computed. If the bounce ratio is greater than a certain threshold, it may be presumed that the domain is under bounce attack from this IP address and can take suitable actions against it (e.g., by refusing all email connections from the IP address at least for a period of time).

Additional rules may be incorporated in the example of Appendix A without detracting from the merits of the present invention.

The response generator 116 may send a response to an email source based on the determination made by the heuristics engine 320.

The response generator 116 may accept the email from the email source (box 306) if the heuristics engine 320 deems that the email is not malicious. In SMTP, the response generator 116 may accept the email simply by replying with a return code 250, for example.

If the heuristics engine 320 deems that the email is likely to be malicious and accordingly needs to be rejected, the response generator 116 may temporarily reject the email (box 307), permanently reject the email, (box 308) or postpone permanent or temporary rejection of the email (309). As will be more apparent below, any or a combination of the just-mentioned responses may be made to confuse a malicious email source that relies on return codes to perpetrate its attack.

A temporary rejection indicates that the domain is not ready to accept the email now but the email source should try again later. Table 3 shows example temporary rejection return codes in SMTP.

TABLE 3

| | |
|---|---|
| 421 | <domain> Service not available, closing transmission channel |
| 450 | Requested mail action not taken: mailbox unavailable |
| 451 | Requested action aborted: local error in processing |
| 452 | Requested action not taken: insufficient system storage |

A permanent rejection indicates that the domain cannot accept the email and further attempts to send the email the same way to the domain will be similarly rejected. Table 4 shows example permanent rejection return codes in SMTP.

TABLE 4

| | |
|---|---|
| 500 | Syntax error, command unrecognized |
| 501 | Syntax error in parameters or arguments |
| 502 | Command not implemented |
| 503 | Bad sequence of commands |
| 504 | Command parameter not implemented |
| 521 | <domain> does not accept mail (see rfc1846) |
| 530 | Access denied |
| 535 | SMTP Authentication unsuccessful/Bad username or password |
| 550 | Requested action not taken: mailbox unavailable |
| 551 | User not local; please try <forward-path> |
| 552 | Requested mail action aborted: exceeded storage allocation |
| 553 | Requested action not taken: mailbox name not allowed |
| 554 | Transaction failed |

In one embodiment, the response generator 116 provides a non-deterministic response to an email that is being rejected. The response is non-deterministic in that it is not based on the actual reason why the email is being rejected. This advantageously confuses a malicious email source that relies on return codes to perform directory harvest and bounce-source attacks. In one embodiment, the response generator 116 randomly selects a rejection return code to reject an email. For example, in SMTP, once the heuristic engine 320 identifies the email is from a malicious source, the response generator 116 may randomly select one of the return codes shown in Tables 3 and 4 and send that as a reply to the email source. As another example, when an email is malicious and needs to be rejected because of an invalid recipient address, the response generator 116 may reply to indicate insufficient storage (return code 452 in SMTP) instead of an invalid recipient mailbox (return code 550 in SMTP). That is, the response generator 116 may determine the actual reason for the rejection based on some standard, and then reply with some other reason for rejection instead.

In one embodiment, the response generator 116 may send a permanent or temporary rejection at a later step, rather than outright. That is, instead of responding to a command or other communication from the email source with a rejection, the response generator 116 may instead respond with an acceptance and then send a rejection at a later step. In one embodiment, the rejection is sent to the email client after several successful command and reply sequences between the email source and the email gateway. That is, the response generator 116 may send the rejection not in response to the command that triggered the rejection, but at a different step in the email transaction.

For example, in SMTP, assuming the email source sent an RCPT TO command with an invalid recipient email address, the response generator 116 may respond to the RCPT TO command with a return code 250 (acceptance) rather than a return code 550 (invalid recipient email address) to postpone the rejection. At a later step in the same email transaction, such as in response to a subsequent DATA command from the email source, the response generator 116 may send a non-deterministic permanent or temporary rejection in reply. The permanent or temporary rejection may be randomly selected or selected as any rejection other than the actual reason for the rejection. Postponing rejection of the email advantageously keeps a malicious email source guessing as to why the email is being rejected, preventing the malicious email source from continuing its attack based on return codes responsive to a particular command.

FIG. 4 schematically shows a computing environment in accordance with an embodiment of the present invention. In the example of FIG. 4, a private computer network 400 includes an email gateway 420, an email server 430, and a plurality of client computers 450 (i.e., 450-1, 450-2, . . . ). The public computer network may include the Internet. An Internet email client 410 represents a remote email source sending emails to the private computer network 400 over the Internet, for example. The email client 410 may comprise another email gateway or email server.

The client computers 450 may be desktop computers employed by users to send and receive emails by way of the email server 430. A client computer 450 may have a commercially available email program, such as the Microsoft Outlook™ software, for composing, sending, and receiving emails. The email server 430 may include a commercially available email server, such as the Microsoft Exchange™ or the Lotus Domino™ email server.

In the example of FIG. 4, all emails in the private computer network 400 are routed through the email gateway 420. In other embodiments, outbound and inbound emails are routed through separate email gateways, while in yet other embodiments inbound and outbound emails are routed through more than one email gateway. In these different embodiments, the functionalities of the email gateway 420 may be distributed as needed. In light of the present disclosure, one of ordinary skill in the art will appreciate that other topologies are possible without detracting from the merits of the present invention.

The email gateway 420 is a "gateway" in that it buffers the email server 430 (and other backend email servers in the network 400) from the public computer network. In the example of FIG. 4, the email gateway 420 is deployed at the edge (i.e., just before the public computer network) of the private computer network 400; it serves as a first entry point for emails entering the private computer network 400 from the Internet. In the example of FIG. 4, for security and performance reasons, the email gateway 420 is separate from the email server 430. In one embodiment, the email gateway 420 is a server computer configured as an SMTP gateway. The email gateway 420 may include the anti-spam 110, components of which are now described with reference to FIG. 1.

As shown in FIG. 1, the anti-spam 110 may comprise the valid email address list 114, the statistics manager 115, and the response generator 116. The valid email address list 114 may comprise computer-readable data listing valid email addresses in the domain protected by the email gateway 420. That is, the valid email address list 114 may include a listing of all email addresses having corresponding mailboxes in the email server 430 and other email servers in the computer network 400. The valid email address list 114 may be in any suitable format without detracting from the merits of the present invention. For example, the valid email address list 114 may comprise a table, a lightweight directory access protocol (LDAP) based directory tree, a database, plain text file, and so on.

The statistics manager 115 may comprise computer-readable program code for gathering statistical information about email traffic through to and from the email gateway 420. The statistics manager 115 may monitor traffic through the email gateway 420 to generate the previously discussed message failed count, recipient failed count, distinct recipient failed count, and total message count for use by the response generator 116.

The response generator 116 may comprise computer-readable program code for generating a response to an email source. The functionalities and operation of the response generator 116 have been previously discussed with reference to FIG. 3.

Table 5 shows an example SMTP email transaction between the email gateway 420 and the Internet email client 410. In the example of Table 5, the email gateway 420 is protecting the domain "@hop1.com," and "John@hop1.com" is not a valid email address in the domain.

TABLE 5

| | |
|---|---|
| 1. | Email client 410 connects to email gateway 420 and incurs no error during HELO/EHLO and MAIL FROM stage. |
| 2. | Email client 410 sends out RCPT TO: John@hop1.com to the email gateway 420. |
| 3. | "hop1.com" is a valid domain. Email gateway 420 accordingly accepts the connection from the email client 410. |
| 4. | Response generator 116 is invoked, with the knowledge of valid email addresses, historical statistics of email client 410, and "John@hop1.com" (recipient email address). |
| 5. | From the valid email address list 114, response generator 116 knows "John@hop1.com" is not a valid email address. |
| 6. | Based on historical statistics from statistics manager 115, response generator 116 knows that email client 410 continues to try sending emails with invalid recipient email addresses to email gateway 420. |
| 7. | From the above observations (steps 5 and 6 of this table), response generator 116 rejects (either permanently or temporarily) the email from the email client 410. |
| 8. | The response generator 116 sends a non-deterministic response to the RCPT TO command (see step 2 of this table) rejecting the email. The non-deterministic response is "server configuration error" (e.g., with return code 421), instead of invalid recipient email address (return code 550). |

In the example of Table 5, the response generator 116 permanently rejects the email from the email client 410 as a direct response to the RCPT TO command that provides an invalid recipient email address. That is, the response generator 116 does not postpone issuance of the rejection.

Table 6 shows another example SMTP email transaction between the Internet email client 410 and the email gateway 420. In the example of Table 6, the email gateway 420 is protecting the domain "@hop1.com," and "John@hop1.com" is not a valid email address in the domain.

TABLE 6

| | |
|---|---|
| 1. | Email client 410 connects to email gateway 420 and incurs no error during HELO/EHLO and MAIL FROM stage. |
| 2. | Email client 410 sends out RCPT TO: John@hop1.com to the email gateway 420. |
| 3. | "hop1.com" is a valid domain. Email gateway 420 accordingly accepts the connection from the email client 410. |
| 4. | Response generator 116 is invoked, with the knowledge of valid email addresses, historical statistics of email client 410, and "John@hop1.com" (recipient email address). |
| 5. | From the valid email address list 114, response generator 116 knows "John@hop1.com" is not a valid email address. |

TABLE 6-continued

| | |
|---|---|
| 6. | Based on historical statistics from statistics manager 115, response generator 116 knows that email client 410 continues to try sending emails with invalid recipient email addresses to email gateway 420. |
| 7. | From the above observations (steps 5 and 6 of this table), response generator 116 decides to reject (either permanently or temporarily) the email from the email client 410 but postpones the rejection. |
| 8. | Response generator 116 replies with a return code 250 to accept the RCPT TO command. This postpones the rejection to a later step in the email transaction. |
| 9. | At the end of the DATA session, the response generator 116 sends a non-deterministic response rejecting the email. The non-deterministic response is "server configuration error" (e.g., with return code 421), instead of invalid recipient email address (return code 550). |

The example of Table 6 is similar to that of Table 5 except the rejection is postponed.

Figure 5:
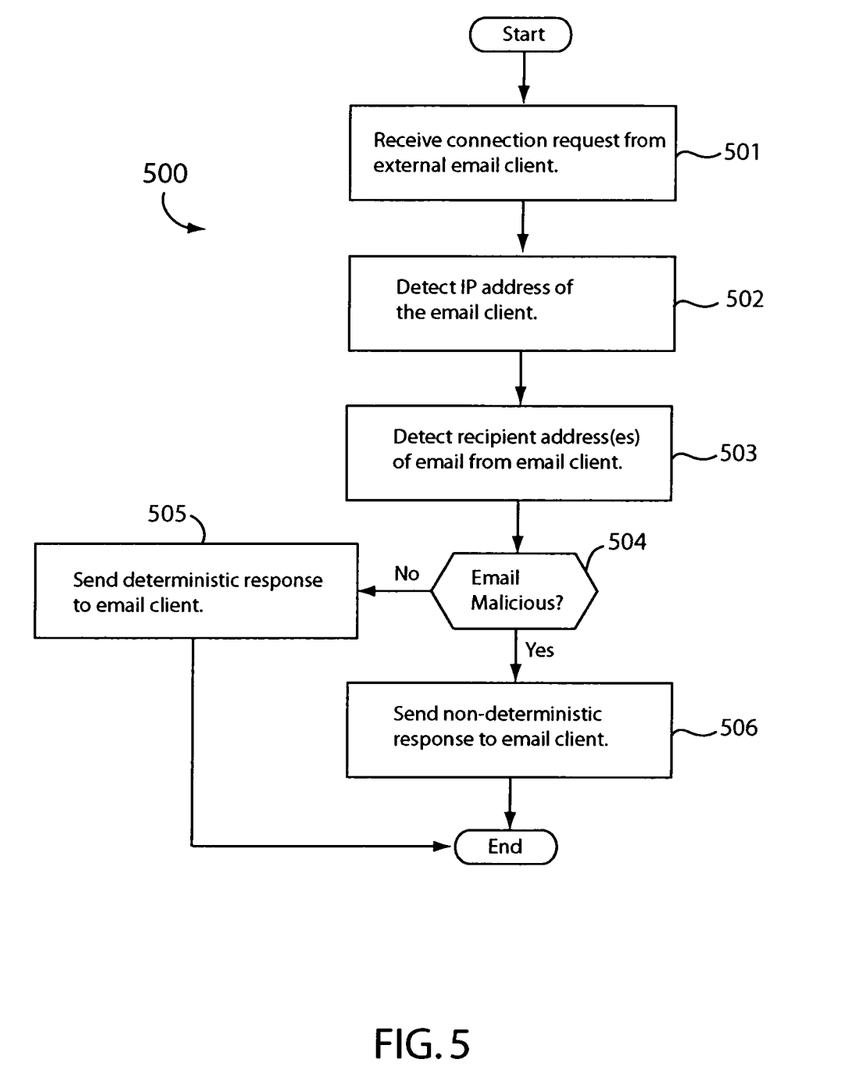
FIG. 5 shows a flow diagram of a method of preventing attacks on an email system in accordance with an embodiment of the present invention.

FIG. 5 shows a flow diagram of a method 500 of preventing attacks on an email system in accordance with an embodiment of the present invention. The method 500 may be performed by the email gateway 420, for example.

In the method 500, an email gateway in a private computer network receives a connection request from an external email client wanting to send an email to a domain protected by the email gateway (step 501). The email gateway may be in a private computer network, while the email client may be outside the private computer network on the Internet. The email gateway detects the IP address of the email client (step 502) and the recipient email address or addresses of the email (step 503). From the recipient email addresses and the IP address of the email client, the email gateway makes a determination as to whether the email client is attacking the domain by sending a malicious email (step 504), such as in a directory harvest or bounce-source attack. For example, the email gateway may look up historical statistics of the IP address, consult a valid address list to check if the recipient email addresses are valid, or both, to determine whether or not the email, and thus the email client, is malicious. If the email gateway determines that the email is not malicious, the email gateway may send a deterministic response (e.g., in accordance with SMTP) (step 505). That is, the email gateway may respond to a non-malicious email in accordance with established conventions, such as in accordance with SMTP. Otherwise, if the email is deemed malicious, the email gateway may send the email client a non-deterministic response rejecting the email (step 506). The non-deterministic response may be sent to the email client right away or postponed until a later step in the email transaction between the email client and the email gateway.

While specific embodiments of the present invention have been provided, it is to be understood that these embodiments are for illustration purposes and not limiting. Many additional embodiments will be apparent to persons of ordinary skill in the art reading this disclosure.

APPENDIX A (C) 2006 Trend Micro, Incorporated.
/*
* Rule #1 to #3 are for DHA and Bounce-Source Attack prevention
*/

=====================================================================
-- Rule #1: High distinct RCPT TO ratio with moderate invalid RCPT TO ratio
/*
INSERT INTO #tmp_IPSpamSource(IPv4, nType)
    SELECT maintmp.upstreammta_ip, 1
    from
(
    select upstreammta_ip, count(*) as recipient_failed_cnt

APPENDIX A-continued

```
        from t_messages
        inner join
        (
                select msgindex, count(*) as failcnt
                from t_cmd_rcpt
                left outer join    t_rcpt_list
                on t_cmd_rcpt.c_rcptto_mailboxindex=t_rcpt_list.c_rcptto_mailboxindex
                        and t_cmd_rcpt.c_rcptto_domainindex=t_rcpt_list.c_rcptto_domainindex
                where msgcount IS NULL
                group by msgindex
        ) as crtmp
        on t_messages.msgindex = crtmp.msgindex
        group by upstreammta_ip
) maintmp
inner join
(
        select upstreammta_ip,
        count( distinct c_rcptto_mailboxindex*1000+c_rcptto_domainindex) as dist_recipient_cnt
        from t_cmd_rcpt
        join t_messages
        on t_messages.msgindex = t_cmd_rcpt.msgindex
        group by upstreammta_ip
) disc_mb
on disc_mb.upstreammta_ip = maintmp.upstreammta_ip
inner join
(
        select ipv4, totalmsgcount, spammsgcount, incompletecount, nullcount,
                virusmsgcount, openrelaycount, custrptcount
        from t_remotemta_iplist
) count_mb
on count_mb.ipv4=maintmp.upstreammta_ip
where recipient_failed_cnt >= 10
        and totalmsgcount >= 5
        and dist_recipient_cnt >= totalmsgcount*8
        and recipient_failed_cnt >= totalmsgcount*0.2
        and maintmp.upstreammta_ip NOT IN ( select IPv4 from #tmp_IPSpamSource)
=======================================================================
-- Rule #2: High invalid RCPT TO ratio with completed messages - possible bounce server attack
INSERT INTO #tmp_IPSpamSource(IPv4, nType)
        SELECT maintmp.upstreammta_ip, 2
        from
(
        select upstreammta_ip, count(*) as recipient_failed_cnt
        from t_messages
        inner join
        (
                select msgindex, count(*) as failcnt
                from t_cmd_rcpt
                left outer join    t_rcpt_list
                on t_cmd_rcpt.c_rcptto_mailboxindex=t_rcpt_list.c_rcptto_mailboxindex
                        and t_cmd_rcpt.c_rcptto_domainindex=t_rcpt_list.c_rcptto_domainindex
                where msgcount IS NULL
                group by msgindex
        ) as crtmp
        on t_messages.msgindex = crtmp.msgindex
        where t_messages.msgiscompleted< >0
        group by upstreammta_ip
) maintmp
inner join
(
        select upstreammta_ip,
        count( distinct c_rcptto_mailboxindex*1000+c_rcptto_domainindex) as dist_recipient_cnt
        from t_cmd_rcpt
        join t_messages
        on t_messages.msgindex = t_cmd_rcpt.msgindex
        group by upstreammta_ip
) disc_mb
on disc_mb.upstreammta_ip = maintmp.upstreammta_ip
inner join
(
        select ipv4, totalmsgcount, spammsgcount, incompletecount, nullcount,
                virusmsgcount, openrelaycount, custrptcount
        from t_remotemta_iplist
) count_mb
on count_mb.ipv4=maintmp.upstreammta_ip
where recipient_failed_cnt >= 10
        and totalmsgcount >= 10
        and dist_recipient_cnt >=10
        and dist_recipient_cnt >= totalmsgcount*0.05
        and recipient_failed_cnt >= totalmsgcount*0.7
```

APPENDIX A-continued

```
        and maintmp.upstreammta_ip NOT IN ( select IPv4 from #tmp_IPSpamSource)
========================================================================
-- Rule #3: Moderate invalid RCPT TO ratio, for general purpose DHA
INSERT INTO #tmp_IPSpamSource(IPv4, nType)
       SELECT maintmp.upstreammta_ip, 3
       from
(
       select upstreammta_ip, count(*) as recipient_failed_cnt
       from t_messages
       inner join
       (
               select msgindex, count(*) as failcnt
               from t_cmd_rcpt
               left outer join    t_rcpt_list
               on t_cmd_rcpt.c_rcptto_mailboxindex=t_rcpt_list.c_rcptto_mailboxindex
                       and t_cmd_rcpt.c_rcptto_domainindex=t_rcpt_list.c_rcptto_domainindex
               where msgcount IS NULL
               group by msgindex
       ) as crtmp
       on t_messages.msgindex = crtmp.msgindex
       group by upstreammta_ip
) maintmp
inner join
(
       select upstreammta_ip,
       count( distinct c_rcptto_mailboxindex*1000+c_rcptto_domainindex) as dist_recipient_cnt
       from t_cmd_rcpt
       join t_messages
       on t_messages.msgindex = t_cmd_rcpt.msgindex
       group by upstreammta_ip
) disc_mb
on disc_mb.upstreammta_ip = maintmp.upstreammta_ip
inner join
(
       select ipv4, totalmsgcount, spammsgcount, incompletecount, nullcount,
               virusmsgcount, openrelaycount, custrptcount
       from t_remotemta_iplist
) count_mb
on count_mb.ipv4=maintmp.upstreammta_ip
where   recipient_failed_cnt >= 10
       and totalmsgcount >= 10
       and dist_recipient_cnt >=10
       and dist_recipient_cnt >= totalmsgcount*0.2
       and recipient_failed_cnt >= totalmsgcount*0.3
       and maintmp.upstreammta_ip NOT IN ( select IPv4 from #tmp_IPSpamSource)
========================================================================
-- Rule #4: Detect bounce email
FUNCTION IsBounceMsg
(
@msg_is_completed TINYINT,
@mailfrom_mailbox CHAR(64),
@mailfrom_domain CHAR(256),
@msg_subject CHAR(256),
@auto_submit TINYINT
)
RETURNS INT
AS
BEGIN
DECLARE @ret AS INT
SET @ret=0
IF @msg_is_completed=1
AND (((@mailfrom_mailbox ='' AND @mailfrom_domain='') OR
(LOWER(@mailfrom_mailbox)='postmaster') OR (LOWER(@mailfrom_mailbox)='mailer-daemon') )
BEGIN
SET @ret= IsBounceContent(@msg_subject, @auto_submit)
END
RETURN @ret
END
----------------------------------------------------------------------------------------------
FUNCTION IsBounceContent (@B_Subject CHAR(256), @B_HasAutoSubmit INT)
RETURNS INT
AS
BEGIN
DECLARE @subject_pattern AS CHAR(256)
DECLARE @auto_submit AS INT
DECLARE @ret AS INT
DECLARE @lowered_subject AS CHAR(256)
SET @ret = 0
SET @lowered_subject = LOWER(@B_Subject)
DECLARE subject_pattern_cursor CURSOR
```

APPENDIX A-continued

```
FOR SELECT Subject, Auto_Submit FROM T_Bounce_Content_Traits
OPEN subject_pattern_cursor
FETCH NEXT FROM subject_pattern_cursor
INTO @subject_pattern, @auto_submit
WHILE @@FETCH_STATUS=0
BEGIN
IF @lowered_subject like RTRIM(@subject_pattern)
BEGIN
IF @auto_submit = 1
 BEGIN
   IF @B_HasAutoSubmit=1
   BEGIN
     SET @ret=1
   END
 END
ELSE
 BEGIN
   SET @ret=1
   BREAK
 END
END
FETCH NEXT FROM subject_pattern_cursor
INTO @subject_pattern, @auto_submit
END
CLOSE subject_pattern_cursor
RETURN @ret
END
==========================================================================
-- Rule #5: Compute the bouce ratio
select tmp1.UpstreamMTA_IP, tmp1.bounce_cnt, tmp2.totalmsgcnt
from
(
   select UpstreamMTA_IP, count(*) AS bounce_cnt from T_Messages where MsgIsBounced=1 group
by
UpstreamMTA_IP
)tmp1
inner join
(
   select UpstreamMTA_IP, count(*) AS totalmsgcount from T_Messages group by UpstreamMTA_IP
)tmp2 on tmp2.UpstreamMTA_IP = tmp1.UpstreamMTA_IP
where bounce_cnt >= 10
and bounce_cnt >= totalmsgcount*0.8
```

What is claimed is:

1. A method to be performed by an email gateway or a server computer in a private computer network, the method comprising:

obtaining a list of internet protocol (IP) addresses of known legitimate email sources;

determining a recipient failed count comprising a total number of invalid recipient email addresses from emails from an email source within a predetermined period of time;

determining a total message count comprising a total number of emails received from the email source within the predetermined period of time;

determining a first ratio of the recipient failed count over the total message count;

determining a message failed count comprising a number of emails from the email source having at least one invalid recipient address;

determining a bounce ratio comprising the message failed count over the total message count if the IP address of the email source is in the list of IP addresses of known legitimate email sources; and classifying the IP address of the email source as a malicious source for a limited period of time if the recipient failed count exceeds a first threshold value, the total message count exceeds a second threshold value, the first ratio exceeds a third threshold value, and the bounce ratio exceeds a fourth threshold value.

2. A private computer network comprising:

an email server;

an email gateway configured to buffer email traffic coming from outside the private computer network to the email server, the email gateway being configured to obtain a list of Internet protocol (IP) addresses of known legitimate email sources, determine a recipient failed count comprising a total number of invalid recipient email addresses from emails from an email source within a predetermined period of time, determine a total message count comprising a total number of emails received from the email source within the predetermined period of time determine a first ratio of the recipient failed count over the total message count, determine a message failed count comprising a number of emails from the email source having at least one invalid recipient address;

determine a bounce ratio comprising the message failed count over the total message count if the IP address of the email source is in the list of IP addresses of known legitimate email sources; and classify the IP address of the email source as a malicious source for a limited period of time if the recipient failed count exceeds a first threshold value, the total message count exceeds a second threshold value, the first ratio exceeds a third threshold value, and the bounce ratio exceeds a fourth threshold value.

3. The private computer network of claim 2, wherein the list of IP addresses of known legitimate email sources comprises a white list.

4. The private computer network of claim 2, wherein the list of IP addresses of known legitimate email sources is obtained, at least in part, using historical statistics.

5. The method of claim 1, wherein the list of IP addresses of known legitimate email sources comprises a white list.

6. The method of claim 1, wherein the list of IP addresses of known legitimate email sources is obtained, at least in part, using historical statistics.

* * * * *